United States Patent [19]
Schaller

[11] 4,154,264
[45] May 15, 1979

[54] HYDRAULIC SHOCK SUPPRESSOR

[76] Inventor: Hilary A. Schaller, R.R. #1, Box 288, Tomah, Wis. 54660

[21] Appl. No.: 850,078

[22] Filed: Nov. 10, 1977

[51] Int. Cl.² .......................................... F16L 55/04
[52] U.S. Cl. ..................................... 138/26; 137/207; 137/568
[58] Field of Search ................... 138/26, 30; 137/207, 137/568, 593

[56] References Cited

U.S. PATENT DOCUMENTS

| | | | |
|---|---|---|---|
| 1,203,525 | 10/1916 | Fuller | 137/568 X |
| 1,249,404 | 12/1917 | Hufferd | 137/593 X |
| 1,740,204 | 12/1929 | Scheminger | 137/568 X |
| 1,795,662 | 3/1931 | McClellon et al. | 137/207 |
| 2,111,473 | 3/1938 | Hudson | 137/207 |
| 2,434,846 | 1/1948 | Hagen | 138/26 X |
| 2,630,833 | 3/1953 | Ragsdale | 138/26 |
| 2,736,246 | 2/1956 | Crittenden et al. | 137/207 X |
| 2,943,641 | 7/1960 | Arnold | 138/26 |
| 2,962,110 | 11/1960 | Depmon | 138/26 X |
| 3,566,416 | 3/1971 | Altieri et al. | 137/206 X |

FOREIGN PATENT DOCUMENTS

| | | | |
|---|---|---|---|
| 200466 | 12/1962 | Sweden | 137/207 |
| 1162707 | 8/1969 | United Kingdom | 137/207 |

*Primary Examiner*—Richard E. Aegerter
*Assistant Examiner*—James E. Bryant, III
*Attorney, Agent, or Firm*—Peter P. Kozak

[57] ABSTRACT

An improved water hammer suppressor which is generally in the form of a first vertical tube closed at its upper end connected into a water distribution piping system at its reduced lower end portion and which in normal operation eventually becomes water logged and must be drained. To facilitate efficient draining of the device when the piping system is drained, a second smaller diameter tube is attached to the tube wall in the reduced diameter portion which extends from the outer end thereof into the main larger diameter portion thereof so as to enter the liquid held therein and cause draining thereof from the suppressor.

7 Claims, 6 Drawing Figures

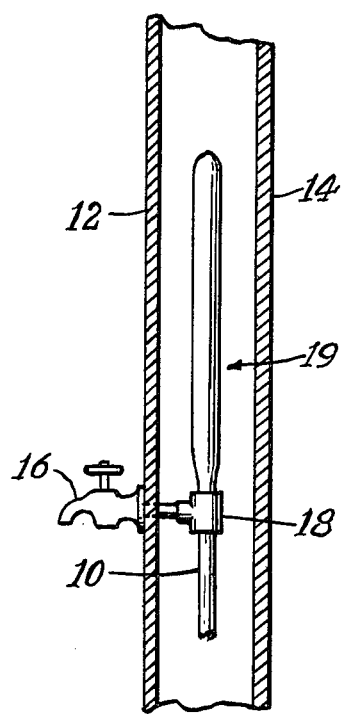
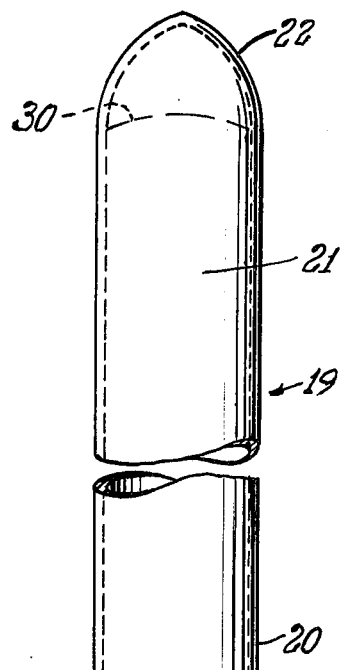
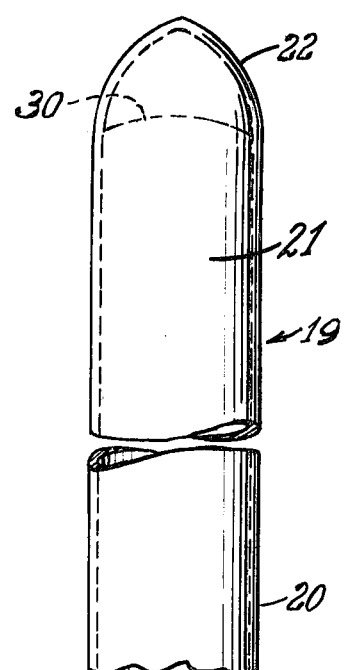
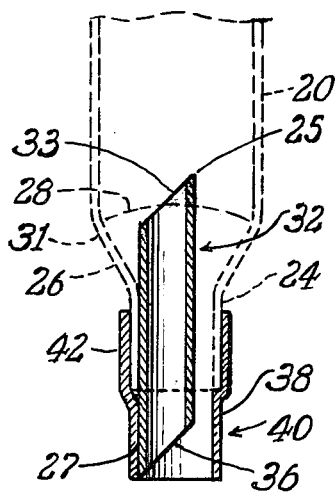
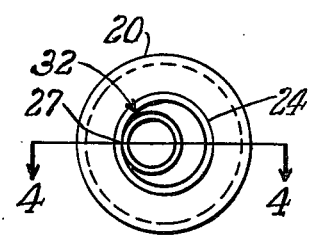
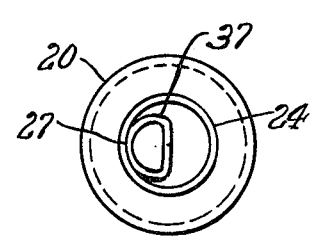
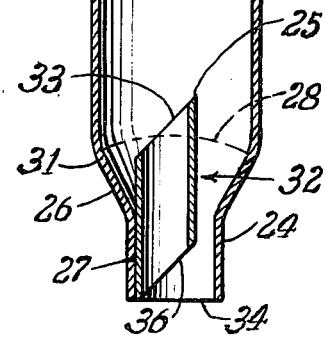
Fig. 1
Fig. 2
Fig. 4
Fig. 6
Fig. 3
Fig. 5

4,154,264

HYDRAULIC SHOCK SUPPRESSOR

BACKGROUND OF INVENTION

This invention related to hydraulic water hammer suppressors such as are usually associated with water distribution systems in domestic homes and other buildings.

Generally the construction of such hydraulic suppressors is regulated by governmental codes and these are normally used at each water supply outlet and are frequently located within a wall where they are not readily accessible.

A typical approved suppressor consists of a tube about fourteen inches long having an internal diameter of one inch over the major portion of its length and is adopted for vertical installation in a piping system. The upper end of the tube is closed by a generally conical portion and the lower end is reduced to a one-half inch internal diameter portion about an inch in length through a generally frusto-conical portion about one-half inch in length. The one-half diameter portion is connected into the one-half inch diameter piping system in fluid flow relation. This suppressor construction results from the governmental code which requires a one-half inch piping system. A suppressor consisting of a one-half inch in diameter tube would be of undue length for effective performance and efficient installation. The above-described one inch diameter suppressor reduced to a one-half inch outlet appears to be a satisfactory compromise and my invention is primarily concerned with a suppressor of this construction.

When installed in a piping or distribution system, the air chamber in the suppressor is initially filled with air. When water is caused to flow in the water line, and an outlet is opened, the water flows into the air chamer in accordance with the pressure in the line, compressing the air in the chamber until the compressed air balances in the line pressure. When the outlet is suddenly closed as for example by a quick-closing valve, there is a sudden increase in the line pressure. The shock of this increase in pressure is cushioned by the somewhat compressed air in the suppressor chamber, thus suppressing water hammer. After the initial shock the line pressure stabilizes at the normal line pressure of, for example, 50 psi and the compressed air in the suppressor air chamber balances the line pressure. Under these normal operating conditions the air chamber is always partially filled with water to the extent necessary for the compressed air to balance the water pressure.

In use, even though the system is air and water tight, the air chamber may become water-logged and ineffective due to the gradual absorption of the air therein by the water, especially where well water is used which has a very low air content and because considerable agitation of the water occurs within the air chamber when the valve is closed. It is then necessary to drain the system in order to rejuvenate the suppressor. Also, in summer homes located in wintery climates which are unheated in the winter, it is necessary to drain water systems for the winter. For reasons to be described hereinafter, the air chamber of the suppressor frequently will not drain when the line piping is drained. At present the usual practice is to hammer the suppressor or otherwise physically jar it or the adjacent piping to disturb the forces holding the water in the suppressor. Since the suppressors are frequently located within walls and other inaccessible places this method of draining water hammer suppressors is less than satisfactory.

SUMMARY OF THE INVENTION

It is a basic object of this invention to provide mechanism associated with a water hammer suppressor of the type described which will cause the air chamber to drain automatically and instantaneously when the water line is drained without physical manipulation of any kind.

It is the further object of this invention to provide existing water hammer suppressors with the water release mechanisms of this invention.

These and other objects are accomplished by inserting a second tube of substantially smaller diameter than the aforesaid one-half inch reduced diameter portion into the suppressor and attaching it to the reduced diameter portion. This second tube extends from the outlet end of the one-half inch diameter portion to a point where it at least intersects or breaks through the lower meniscus of the water contained in the larger diameter portion or extends into the water. This point is approximately at the point where one inch diameter portion of the suppressor meets the frusto-conical portion. Preferably the second tube has an outside diameter not appreciably greater than three-eighths inch so as to avoid closing off the air chamber outlet unnecessarily. The internal diameter of the second tube preferably is not appreciably less than three-sixteenths inch for effective operation. It is also preferred to provide the second tube with ends which are cut at an angle of about forty-five degrees to the transverse plane of the tube for most effective performance and most efficient use of material. For installation in an existing suppressor an adaptor is formed wherein the second tube is attached within a short section of one-half inch diameter tube similar to the one-half inch portion of the suppressor and an annular flange is provided on the one-half inch diameter section to form a bell-like structure for snugly receiving a substantial portion of the one-half inch diameter portion of the suppressor and is adapted to be brazed thereto. The second tube is located within the adaptor and is of a length so that when attached to the suppressor it extends from the adaptor opening to within the one inch diameter portion.

BRIEF DESCRIPTION OF THE DRAWINGS

Various objects and advantages will appear from the following detailed description of the invention with reference to the drawings in which:

FIG. 1 is an elevation view of a typical water hammer suppressor installation.

FIG. 2 is an elevation enlarged view of the suppressor of this invention.

FIG. 3 is the bottom end view of FIG. 2.

FIG. 4 is a section taken along line 4 of FIG. 3 with parts broken away and shown in cross section.

FIG. 5 is a bottom view similar to FIG. 3 showing a modified form of the invention.

FIG. 6 is an elevation cross sectional view of an adaptor embodying the invention.

DESCRIPTION OF PREFERRED EMBODIMENTS

FIG. 1 illustrates a typical suppressor installation of the type involved in this invention including a one-half inch water line pipe 10 located between the inner panel 12 and the outer panel 14 of a building wall and connected to a conventional faucet 16 through a T fitting 18. Connected to the T fitting 18 is the hydraulic shock or water hammer suppressor 20. As is well known, the shock is caused by the quick closing of valves such as valve 16 and especially those closed by quick closing devices such as solenoids. The shock is caused by the water moving at a relatively high velocity being stopped by the valve 16. Preferably the suppressor 19 is located as close to the point of water impact of the valve 16 as practical on the pressure side thereof.

As previously mentioned, governmental codes usually require the line 10 to be one-half inch internal diameter which requires the suppressor 19 to be connected to a one-half inch line. FIG. 2 is an enlarged view of the suppressor 19 which includes my invention. The standard portions of the suppressor 19 include the main body portion 20 having a one inch internal diameter which is closed at its upper end by a generally conical portion 22 about one-half inch long and is reduced at its lower end to a one-half inch internal diameter tube portion 24 about one inch long through a frusto-conical portion 26 about one-half inch in length. The lower end 24 is reduced to the one-half inch portion to correspond in size to the line 10.

The design of this suppressor, particularly the frusto-conical portion 26 and the one-half inch section 24 has created a problem which under most installation conditions prevents the water from draining out of the air chamber 21 of the suppressor when the line is drained as previously described.

Under these conditions the water appears to form a lower meniscus 28 as shown by a broken line and an upper meniscus 30. It appears that the junction 31 of the one inch tube portion 20 with the frusto-conical portion 26 creates a surface tension area which prevents the flow of water through the one-half inch portion 26.

It is further understood that in closed chambers, adhesion forces exist between the water and the chamber surfaces and cohesion forces exist at the tube opening. These together with the partial vacuum above the water in the air chamber appear to overcome the force of gravity acting on the water and hence to prevent flow of the water from the chamber.

I have discovered that placing a smaller diameter tube 32 as shown in FIGS. 2 and 4, which extends from the base 34 of the tube portion 24 through a transverse plane or junction 31 where the larger diameter portion 20 joins the frusto-conical portion 26 so as to penetrate the meniscus 28 as shown, will effect an instantaneous draining of the water from the air chamber 21 when the water in the line 10 is drained. The tube 32 is attached to the one-half inch diameter portion 24 preferably by welding or brazing.

For the best performance with a suppressor as described having the one-half inch diameter portion 24, the tube 32 should not be smaller than three-sixteenths inch internal diameter and not more than about three-eighths inch outside diameter. If the tube is smaller than three-sixteenths, the adhesion or cohesion forces may render the tube inoperative. A tube 32 larger than three-eights inch appears to close off the air chamber outlet unduly for best performance.

In general it has been found that the cross sectional area of the small tube should be less than one-half the cross sectional area of the reduced diameter tube portion 24.

FIG. 3 is an end view illustrating the spatial relationships with the tube 32 being bonded or brazed to the one-half inch tube section 24 in the area 27. FIG. 5 is a modification showing the tube 37 corresponding to tube 32 of FIG. 3 to be somewhat flattened to provide a surface portion having a curvature similar to the curvature of the tube 24 over a substantial area so as to provide a greater area of contact between the tubes for improved attachment.

As shown in the FIGS. 2 and 4, the tube 32 is preferably cut at each end at a 45 degree angle to the transverse plane of the tube to form the upper oblique end 33 and the lower oblique end 36. This permits effective operation of the tube at minimum length and hence a saving of material which is usually copper. For effective operation it is only necessary for the internal diameter portion of the tip 25 to penetrate the meniscus 28. The tube height or length at which this occurs may readily be determined by filling an air chamber with water and determining the minimum length needed for effective draining by trial and error. For a particular suppressor construction this length will always be the same. The oblique lower end 36 of the tube 24 also facilitates drainage since it appears to prevent the formation of a drain interfering meniscus at the lower end thereof and is a preferred feature. A tube 32 having a bottom end which is at a right angle to the longitudinal axis of the tube is workable however. The use of the oblique ends described has the added advantage that in the manufacture of the suppressor, sections of the small diameter tubing may be cut from the tube stock without waste. Although a forty-five degree angle appears optimum, angles of 30 to 60 degrees are effective. Although it is preferred to minimize the length of the tube 32 for reasons stated this tube may extend to any extent within the water trapped therein and it is not essential that the tube end 33 be oblique under such conditions.

The invention may be incorporated in existing suppressors by the use of the adaptor 40 shown in FIG. 6 in which a one-half inch diameter tube section 38 corresponding in size to the tube section 24 is provided with a flange 42 of a diameter such as to snugly receive the tube section 24 of FIGS. 2 and 4 as shown in broken lines. The small diameter tube 32 is attached to the tube 38 portion in the area 27 in the same manner as the tube 32 is attached to tube section 24 in FIG. 2. In use the outlet section 24 of the suppressor is received in the flanged portion 42 preferably so as to form a continuation of the section 38 and is brazed to the flange 42. The length of the tube 32 is of course, adjusted to take into account the added effective length of the one-half inch diameter suppressor outlet portion caused by the addition of the adaptor to insure that the tube 32 penetrates the meniscus formed in the air chamber as above described. Although the invention has been described specifically in terms of a water distribution system, it will be apparent to those skilled in the art that it is applicable to the distribution of other liquids. Further, although the invention has been disclosed in terms of a specific size suppressor, it would be apparent to those skilled in the art that the invention may be readily adapted to other size suppressors varying, for example, from 14 to 30 inches in length with the air chamber portion varying from 1 to 2 inches and with the outlet end varying from ½ to ¾ inches in diameter within the scope of the invention.

I claim:

1. A first tube adapted for vertical positioning in a piping system having a larger diameter over the major portion of its length terminating in a closed portion at its top end and in a reduced diameter portion of constant diameter at its bottom for fluid flow connection in a piping system with said reduced diameter portion being jointed to said major portion by a generally frusto-conical portion, a second tube smaller in diameter than said reduced diameter portion attached to the inner surface of said reduced diameter portion extending longitudinally from the open end of the smaller diameter portion to a height above said frusto-conical portion providing a passageway between at least a part of the outside diameter of the second tube and the inside diameter of said reduced diameter portion.

2. A hydraulic device for eliminating hydraulic shock for connection vertically in fluid flow relation in a piping system comprising:

a first tube closed at the top end having a reduced diameter portion at the other end adapted for connection to said piping system in fluid flow relationship, the chamber in said tube when connected to said piping normally containing sufficient air to suppress hydraulic shock and after prolonged use losing a substantial proportion of the air and become liquid logged so as to become ineffective to suppress hydraulic shock and the liquid in said chamber forming a meniscus in the vicinity of the commencement of said reduced diameter portion when said piping system is drained a second tube within said reduced diameter portion providing a passageway between at least a part of the outside diameter of the second tube and the inside diameter of said reduced diameter portion, disposed longitudinally thereof and attached thereto, said second tube having its outer end extending substantially to the open end of said reduced diameter portion and its inner end extending sufficiently into said first tube to penetrate said meniscus and to enter the liquid trapped in said first tube and be operative to release the liquid from said first tube.

3. A hydraulic device for eliminating water hammer adapted for connection vertically in fluid flow relation in a water distribution piping system comprising:

a first tube closed at one end and having a reduced diameter portion at the other end and adapted for fluid flow connection to said piping system, the chamber in said tube when connected to said piping normally containing sufficient air to suppress water hammer and after prolonged use to lose a substantial proportion of the air and become water logged so as to become ineffective to suppress water hammer, the water in said chamber forming a meniscus in the vicinity of the commencement of said reduced diameter portion when the piping system is drained;

a second tube within said reduced diameter portion disposed longitudinally thereof and attached thereto, said second tube having at least its inner end formed at an angle of about 30 to 60 degrees to the transverse plane of said smaller tube, said second tube having its outer end extending substantially to the open end of said reduced diameter portion and its inner end extending sufficiently into said first tube to intersect said meniscus and the cross sectional area of said second tube being less than the cross sectional area of said reduced diameter portion of said first tube.

4. The device of claim 3 wherein both ends of said second tube are formed at an angle of 30 to 60 degrees.

5. The device of claim 3 wherein the ends of said second tube are each formed at an angle of about 45 degrees.

6. A hydraulic device for eliminating water hammer adapted for connection vertically in fluid relation in a one-half inch internal diameter water distribution piping system comprising:

a one inch diameter tube closed at one end and reduced in diameter to a one-half inch portion through a generally frusto-conical portion, said one-half inch portion being adapted for fluid flow connection to said system, the chamber in said tube when connected to said system normally containing sufficient air to suppress hydraulic shock and after prolonged use to lose a substantial proportion of the air and become water logged so as to become ineffective to suppress hydraulic shock and the water in said chamber forming a meniscus in the vicinity of the junction of said one inch portion and said frusto-conical portion when said system is drained;

a second tube from three-sixteenths to three-eights inch outside diameter disposed longitudinally within said one-half inch portion and attached to a wall thereof, said second tube having each end formed at an angle of forty-five degrees to a transverse plane of said second tube, said second tube having its outer end extending substantially to the open end of said one-half inch diameter portion and its inner end extending sufficiently into said chamber to intersect said meniscus.

7. A hydraulic device for use in a hydraulic shock suppressor consisting of a first tube of relatively large diameter adapted for vertical installation in a liquid distribution piping system, said first tube having a closed top end and a lower end reduced to a smaller diameter portion through a generally frusto-conical portion adapted for fluid flow connection to said piping system, the chamber in said first tube when connected to said piping system normally containing sufficient air to suppress water hammer and after prolonged use to lose a substantial portion of the air and become water logged so as to become ineffective to suppress water hammer, the water in said chamber forming a meniscus in the vicinity of the commencement of said reduced diameter portion when the piping system is drained.

said device comprising an open end tube of substantially the same diameter as said smaller portion and having a longitudinal flange at one end thereof, a smaller tube providing a passageway between at least a part of the outside diameter of said smaller tube and the inside diameter of the said smaller diameter portion disposed within and longitudinally of said device extending from the other end of said device and outwardly of said flange, said flange being adapted to receive at least a portion of said smaller diameter portion and be attached thereto, said smaller tube being of a length so as to penetrate said meniscus in said first tube when said device is attached to said smaller diameter portion of said suppressor.

* * * * *